United States Patent [19]

O'Connor

[11] 4,418,935

[45] Dec. 6, 1983

[54] PIN LOCK FOR ADJUSTABLE LINK OF A THREE-POINT HITCH

[75] Inventor: John W. O'Connor, Hales Corners, Wis.

[73] Assignee: Allis-Chalmers Corporation, Milwaukee, Wis.

[21] Appl. No.: 330,508

[22] Filed: Dec. 14, 1981

[51] Int. Cl.³ .............................................. B60D 1/14
[52] U.S. Cl. .............................. 280/461 A; 280/482; 403/46; 403/320; 411/217; 411/220
[58] Field of Search .................. 280/482, 461 A, 504; 403/46, 320; 411/216, 217, 218, 219, 220, 221

[56] References Cited

U.S. PATENT DOCUMENTS

| 717,382 | 12/1902 | Frei | 411/217 |
|---|---|---|---|
| 1,562,141 | 11/1925 | Bisbing | 411/220 |
| 3,132,556 | 5/1964 | Doering et al. | 411/340 |
| 3,433,118 | 3/1969 | Ward | 411/340 |
| 3,731,951 | 5/1973 | Gruenberger | 280/461 A |
| 3,825,283 | 7/1974 | Hansen | 280/461 A |

Primary Examiner—Joseph F. Peters, Jr.
Assistant Examiner—Donn McGiehan
Attorney, Agent, or Firm—Arthur L. Nelson

[57] ABSTRACT

A pin lock for a turnbuckle of an ajdustable link on a three-point hitch. The pin locks the threads of the turnbuckle and is retained in the locking position by a retainer ring.

11 Claims, 6 Drawing Figures

PIN LOCK FOR ADJUSTABLE LINK OF A THREE-POINT HITCH

BACKGROUND OF THE INVENTION

This invention relates to an adjustable link of a three-point hitch and more particularly to a pin lock for an adjustable link of a three-point hitch for locking the threads of a turnbuckle in the adjusted position.

The lift link of the upper link of a three-point hitch requires adjustment of their length to accommodate changing operating conditions. The three-point hitch which is carried on the tractor must provide adjustment to adapt the implement to varying soil conditions and work conditions. Normally a turnbuckle is used to vary the length of the upper link or the lift link of a three-point hitch. To retain the adjusted position a locking means is usually provided on the link. U.S. Pat. No. 3,825,283, Hansen, illustrates an adjustable link with a locking wrench for a tractor three-point hitch. The link is adjusted with a turnbuckle arrangement and carries a wrench which can be selectively positioned to lock the turnbuckle in its adjusted position or reposition the wrench to make the adjustment of the three-point hitch. In this device the wrench is provided to make the adjustment or to lock the turnbuckle in its adjusted position.

SUMMARY OF THE INVENTION

The applicant's invention, however, provides for a hexagon head on the turnbuckle which is rotated by a wrench. The applicant provides for a locking device which includes a pin which can be inserted in a slot formed by recesses in the turnbuckle sleeve and the inner screw member which locks the link in its adjusted position. The pin is retained in its locking position by means of a ring biased to a latched position so that the pin will not loosen and allow the link to lose its adjustment.

It is an object of this invention to provide a pin lock on an adjustable link of a three-point hitch.

It is another object of this invention to provide an adjustable link of a three-point hitch with a retainer to retain the locking pin in its locking position on the adjusted link.

It is a further object of this invention to provide a pin lock in the threads of a turnbuckle to lock the link in its adjusted position with means to retain the pin in its locking position once the link is adjusted.

The objects of this invention are accomplished in an adjustable link of a three-point hitch. The link is adjusted by a turnbuckle which includes a sleeve threadedly engaging two extensible screw members. Rotation of the sleeve extends or contracts the length of the link and a locking device including a pin locks the link in its adjusted position. The locking pin has a flat side which engages a flat side of an extensible screw member and is retained in a slot formed in the sleeve and screw member of the turnbuckle. The pin includes a latch means which retains the pin in its locked position to maintain the adjusted position of the link.

BRIEF DESCRIPTION OF THE DRAWING

Referring to the drawings, the preferred embodiment of this invention is illustrated.

DESCRIPTION OF THE PREFERRED EMBODIMENT

Figure 1:
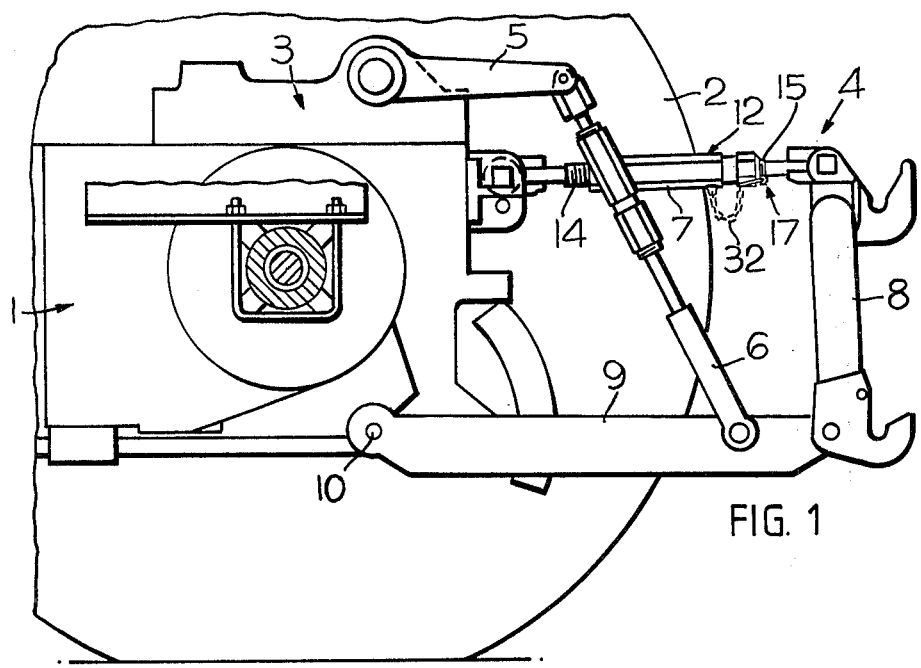
FIG. 1 illustrates a partially sectioned side elevation view of a tractor carrying a three-point hitch.

Referring to the drawings the tractor 1 having a rear drive wheel 2 is shown. The rear drive assembly 3 supports the three-point hitch 4. The rock arms 5 carry the lift links 6 of which one is shown. The upper link 7 is connected to a bracket on the rear drive housing 3 and connected to a hitch adapter 8. The lower draft arms 9 of which one are shown is carried by lift link 6 and the rock arm 5. The lower draft arms are connected through a pivotal connection 10 to the rear drive housing.

Figure 2:
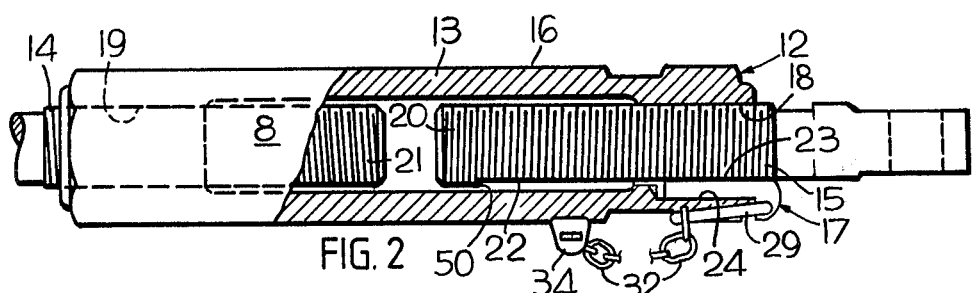
FIG. 2 is a partially sectioned view of an adjustably extensible link.
Figure 3:
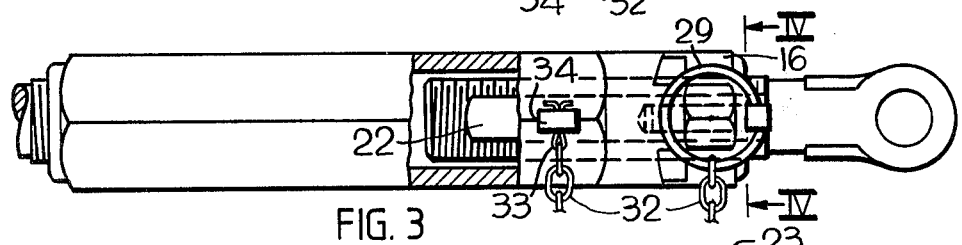
FIG. 3 illustrates a partial cross section view of an adjustable link showing the pin and latch in latching position.
Figure 4:
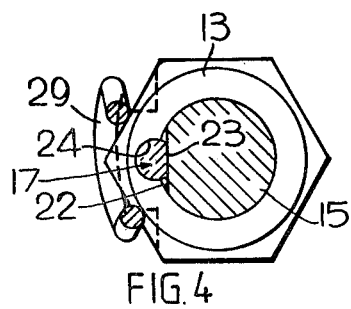
FIG. 4 is a cross-section view taken on line IV—IV of FIG. 3.

FIGS. 2, 3 and 4 show an adjustable link 8. It is understood that the adjustable link 8 is the upper link as shown on the three-point hitch, but the adjustable device can be used on the lift link 6 as well. For the purpose of illustration, the upper link is shown. A turnbuckle 12 includes a sleeve 13 and screw members 14 and 15. The sleeve 13 is internally threaded at 18 and 19 to threadedly engage the threaded portions 20 and 21 of the screw members 15 and 14. As the sleeve 13 is rotated the screw members 14 and 15 extend from the sleeve or withdraw into the sleeve depending on the direction of rotation of the sleeve. The sleeve is rotated by a wrench which is fitted on the hex head 16 of the sleeve 13. The pin 17 is removed to allow rotation of the sleeve relative to the screw member 15.

The screw member 15 is constructed with a flat surface 22 which engages a flat surface 23 on the pin 17. A slot 24 is formed in the sleeve 13. As shown in FIG. 4, the pin surface 23 forms an interface with the flat surface 22 on the screw member 15. The pin 17 in the slot 24 locks the screw member 15 relative to the sleeve 13 when the pin is inserted in the slot 24 between the sleeve 13 and screw member 15.

The flat surface 22 does not extend to the end of the screw member 18. This forms a shoulder 50 which prevents the pin from locking when the screw is not screwed sufficiently into the sleeve 13 to provide adequate thread engagement. This is a safety precaution and improves reliability.

Figure 5:
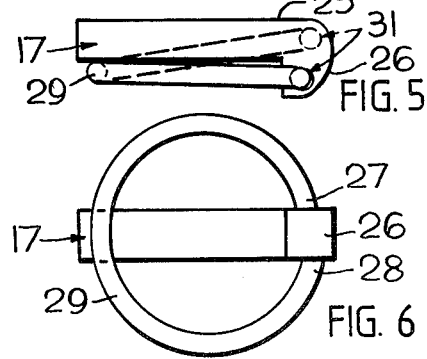
FIG. 5 is a side elevation view of the pin and the latch element.
Figure 6:
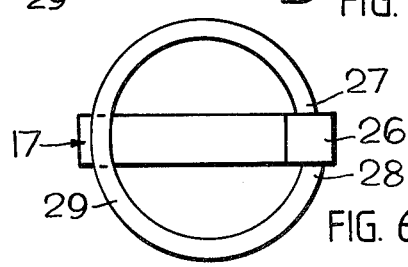
FIG. 6 is a plan view of the pin and latch element.

The pin 17 has generally a cylindrical cross section as shown in FIG. 4. The pin also has a head 26 with drilled holes on the opposing sides for receiving the ends 27 and 28 of the ring 29. The offset positioning of the openings as shown at 31 in FIG. 5 places a strain on the ring which biases the ring to the position shown in FIG. 5. Raising the ring to a right angle position from the pin will place an increased strain on the ring and bias the ring to the position in FIG. 5. Accordingly, when the pin is inserted in the slot 24 and then positioned as shown in FIG. 5, it will remain in this position and latch the pin in its locking position on the link.

The ring 29 shown in FIG. 3 carries the chain 32. The opposite end of the chain is connected to a key 33 which is fastened to the lug 34. Accordingly, the pin is fastened through the chain to the link whether it is in the latched position, as shown in FIG. 2, or if it is free on the chain when the link is being adjusted.

The operation of the device will be described in the following paragraphs.

The link 7 comprises a turnbuckle 12 including the sleeve 13 which can be rotated to extend or withdraw the screw members 14 and 15 within the sleeve. In order to adjust the length of the link the pin 17 is withdrawn from the slot 24. A wrench is fitted to the hex head nut 16 which is integral with the sleeve 13 and the sleeve is rotated. When the proper length of sleeve is adjusted, the sleeve is rotated to align the slot 24 with the flat surface 22. The pin 17 is then inserted so that the flat surface 23 forms an interface with the flat surface 22 of the screw member 15. In this position the pin is slid all the way into the slot 24 and the ring is pressed against the hex head 16. The biasing force of the ring 29 retains the ring in this position and will not allow the pin to come loose from its locking position until someone removes it. To remove it the ring is lifted from the link to a right angle position with the pin 17 and the pin can be removed.

The embodiments of the invention in which an exclusive property or privilege is claimed are defined as follows:

1. A three-point hitch having a lock on an adjustable length link comprising, an internally threaded sleeve threadedly receiving an externally threaded screw member forming a threaded interface between the sleeve and screw member, said sleeve having a shoulder on the end receiving said screw member, means defining a slot interrupting the threaded interface formed by said sleeve and said screw member, a pin received in said slot to prevent relative rotation between said sleeve and said screw member, a latch on said pin including a ring biased toward the side of said pin engaging the shoulder on said sleeve preventing its movement from the slot in said link.

2. A three-point hitch having a lock on an adjustable length link as set forth in claim 1 including two adjustable screw members threadedly engaging said sleeve.

3. A three-point hitch having a lock on an adjustable length link as set forth in claim 1 wherein said shoulder on said sleeve defines a hex head adapted for rotating said sleeve.

4. A three-point hitch having a lock on an adjustable length link as set forth in claim 1 wherein said screw member defines a flat surface for engaging said pin.

5. A three-point hitch having a lock on an adjustable length link as set forth in claim 1 including a chain connecting said ring to said sleeve.

6. A three-point hitch having a lock on an adjustable length link as set forth in claim 1 including means defining a flat surface on a screw thread of said screw member, means defining a round pin slot in said sleeve, means defining a flat surface on said pin, said slot receiving said pin whereby said flat surface on said screw member forms an interface with the flat surface on said pin when said pin is in a locked position.

7. A three-point hitch having a lock on an adjustable length link as set forth in claim 1 wherein said shoulder on said sleeve defines a hex head, said ring connected to said pin biased to a latching position receiving a portion of said hex head to latch said pin in its locked position.

8. A three-point hitch having a lock on a adjustable length link as set forth in claim 1 wherein said pin defines a semicylindrical cross section forming a flat surface on one side of said pin, said means defining said slot forming a round slot in said sleeve for receiving said pin, and a means forming a flat surface on said screw member engaging said pin to form an interface of the flat surface of said pin with the flat surface of said screw member when said pin is receiving said slot.

9. A three-point hitch having a lock on an adjustable length link as set forth in claim 1 wherein said pin defines a semicylindrical cross section and a flat surface on one side of said pin, said screw member defines a flat surface on one side of said screw member, said flat surface on said pin and said flat surface on said screw member form an interface when the pin is latched in its locking position.

10. A three-point hitch having a lock on an adjustable length link as set forth in claim 1 wherein said screw member has a fully threaded end, means defining a recess for a portion of said screw member defining said slot, a stop spaced from the threaded end of said screw member at the end of said slot for engaging said pin limiting the minimum threaded interface between said screw member and said sleeve when said pin is latched.

11. A three-point hitch having a lock on an adjustable length link as set forth in claim 1 comprising a surface defining a recess on the side of said screw member and a stop spaced from the threaded end of said screw member forming a portion of said slot, said stop engaging the end of said pin to limit the minimum threaded interface between said screw member and said sleeve when said pin is latched.

* * * * *